N. H. DAVIS.
Carriages and Wagons.

No. 153,545. Patented July 28, 1874.

Witnesses:
Harry C. Clark
James J. Finley

Inventor
N. H. Davis by
H. W. Beadle & Co.
attys

UNITED STATES PATENT OFFICE.

NATHAN H. DAVIS, OF GREENVILLE, SOUTH CAROLINA.

IMPROVEMENT IN CARRIAGES AND WAGONS.

Specification forming part of Letters Patent No. 153,545, dated July 28, 1874; application filed July 23, 1874.

*To all whom it may concern:*

Be it known that I, NATHAN H. DAVIS, of Greenville, in the county of Greenville and State of South Carolina, have invented a new and useful Improvement in Two-Wheeled Vehicles; and I do hereby declare that the following is a full and exact description of the same, reference being had to the accompanying drawings and to the letters of reference marked thereon.

This invention has for its object to so unite the body and shafts of a two-wheeled vehicle that the parts, to a limited extent, will move independently of each other, so that the vibrations of the shafts will not be communicated to the body, or the shocks received by the body to the shafts; and consists in the combination of a bent axle, a pair of shafts adapted to revolve upon the axle, and an intermediate spring-connection uniting the shafts to the axle, as will be fully described hereinafter.

Figure 1:
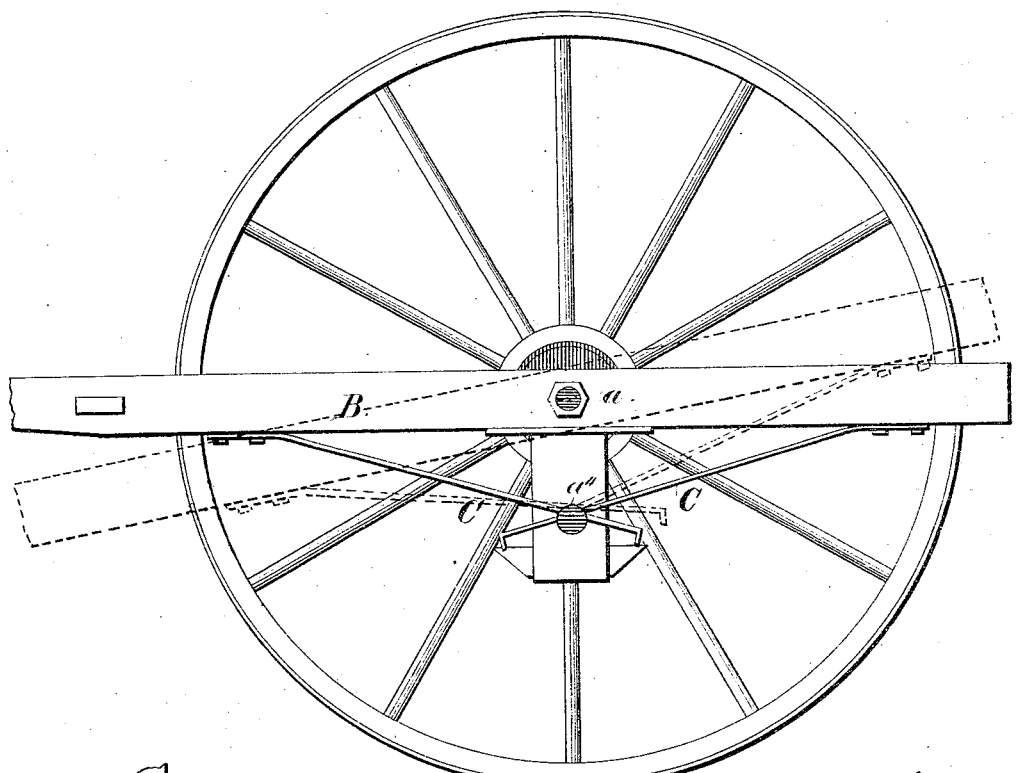
Figure 2:
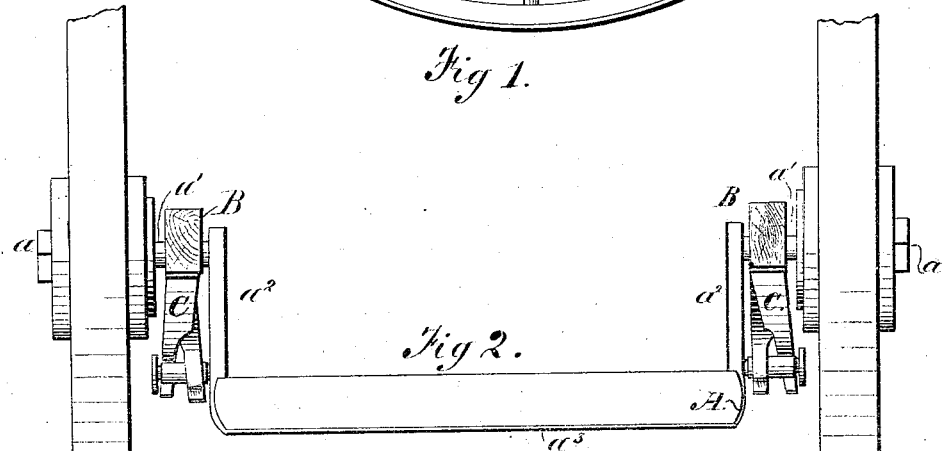

In the drawings, Figure 1 represents a side elevation with the nearest wheel removed, and Fig. 2 a rear elevation of my improved vehicle.

To enable others skilled in the art to make and use my invention, I will now proceed to describe fully its construction and manner of operation.

A represents a bent axle, provided with journels $a$ $a$ for the supporting-wheels, bearings $a^1$ $a^1$ for the shafts or thills, the vertical parts $a^2$ $a^2$, and the main horizontal portion $a^3$, the latter being adapted to support the body of the vehicle. B B represent the shafts, journaled at the proper points upon the horizontal bearings $a^1$ $a^1$ of the bent axle in such manner as to turn freely thereon. C C represent springs of identical construction, located upon the lower side of the shafts in front and rear of the pivot-point, the same being rigidly fixed at one end, but adapted at the other to bear with an elastic pressure upon the upper side of the stud or spindle $a^4$, attached to the vertical portion of the bent axle, as shown.

By means of the described construction it will be understood that a loose connection is made between the shafts and the body of the vehicle, so that one is free to move, within certain limits, without affecting the other, the free ends of the springs playing on the stud or spindle of the axle freely to permit such independent movement, but being sufficiently rigid to form a secure connection between the two, and keep the parts in their proper relative positions.

If desired, the stud or spindle may be provided with a roller for the purpose of reducing the friction between the moving parts.

It is desirable in adapting a body to the described construction that it should be so arranged as to throw the weight of the load over the axle.

Any suitable springs may be employed, and they may be adapted in any proper manner to bear with greater or less pressure, as may be desired.

The extreme end of the springs may also be bent as shown, to furnish a stop to limit the play between the shafts and the axle.

Having thus fully described my invention, what I claim as new, and desire to secure by Letters Patent, is—

1. In a two-wheeled vehicle, the combination of the bent axle, the pivoted shafts, and the intermediate spring-connection C C, substantially as described.

2. The combination of the springs C C and the central stud $a^4$ upon the axle, as described.

This specification signed and witnessed this 23d day of July, 1874.

N. H. DAVIS.

Witnesses:
 HARRY C. CLARK,
 H. ELLA MATTHEWS.